May 4, 1948.  B. M. PETERS  2,440,757
MOTOR DRIVEN ROTARY CULTIVATOR
Filed May 14, 1945  3 Sheets-Sheet 1
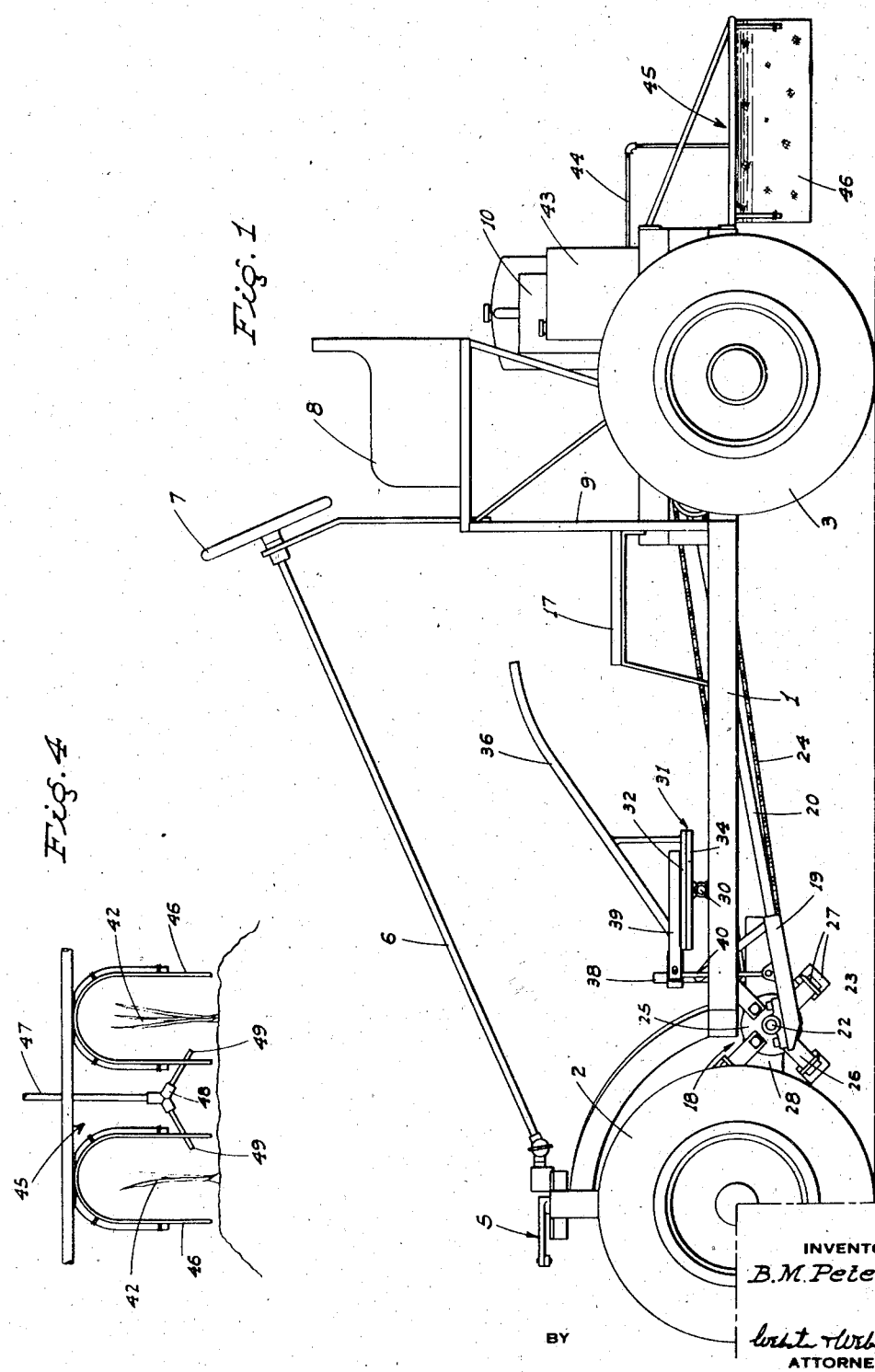
INVENTOR
B. M. Peters
BY
ATTORNEYS

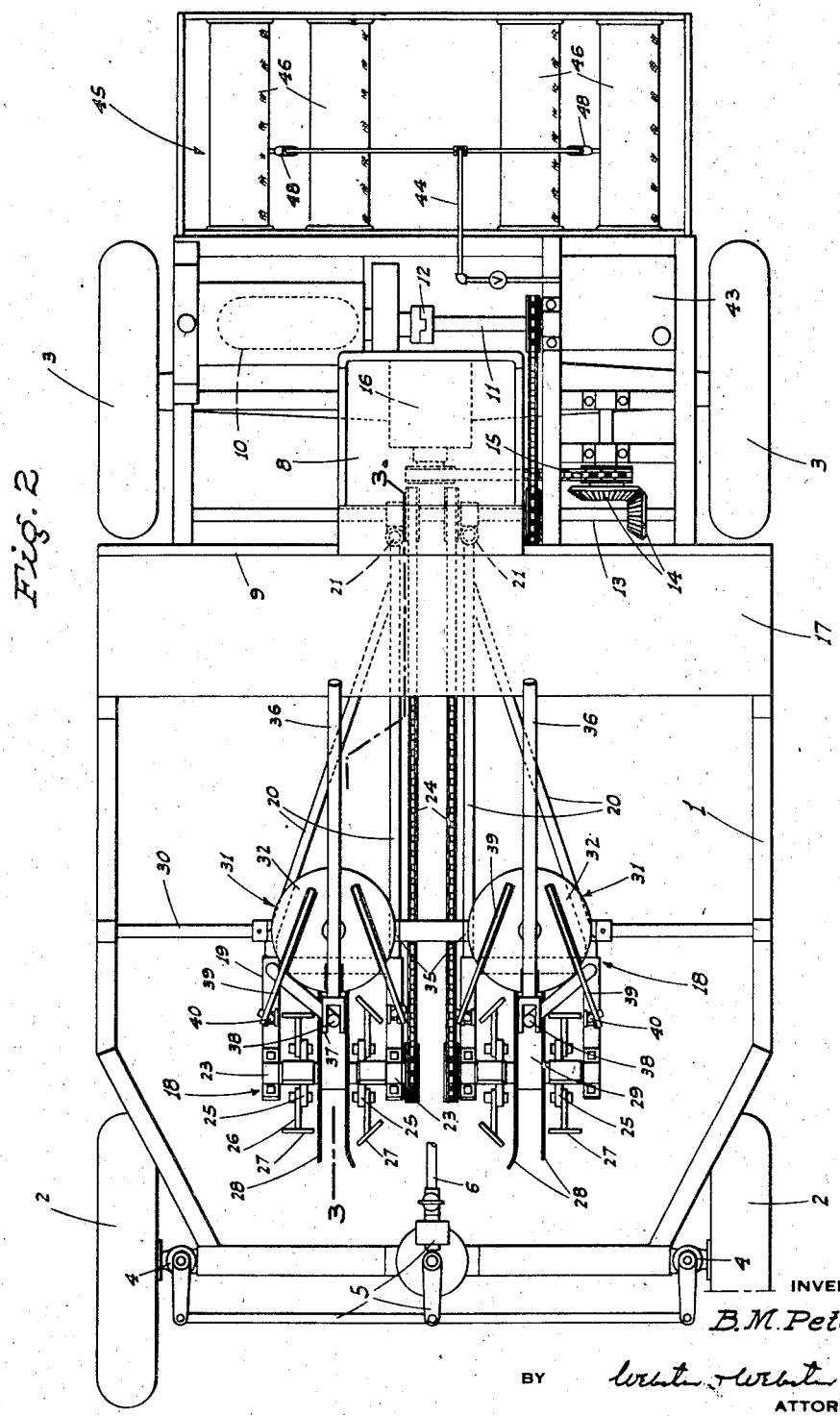

May 4, 1948.　　　　B. M. PETERS　　　　2,440,757
MOTOR DRIVEN ROTARY CULTIVATOR
Filed May 14, 1945　　　　3 Sheets-Sheet 3
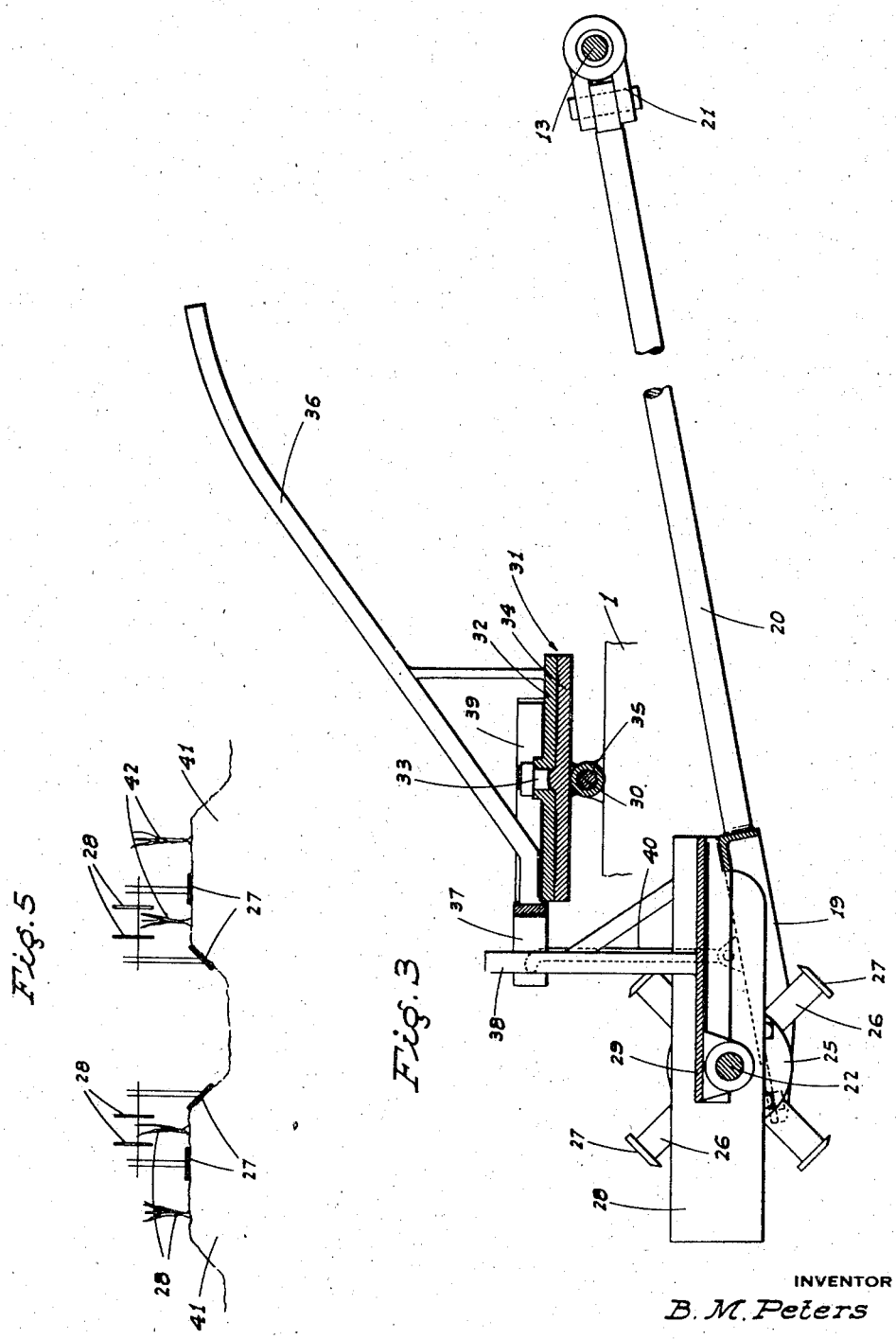
INVENTOR
B. M. Peters
ATTORNEYS Patented May 4, 1948

2,440,757

UNITED STATES PATENT OFFICE 2,440,757

MOTOR-DRIVEN ROTARY CULTIVATOR

Byron M. Peters, Lathrop, Calif.

Application May 14, 1945, Serial No. 593,575

10 Claims. (Cl. 97—40)

This invention relates in general to an improved agricultural implement; the invention being directed in particular to, and it is an object to provide, a novel power-actuated ground working implement especially designed for cultivating, weeding, mulching, and the like, of row crops.

An additional object of the invention is to provide an implement, as above, which is arranged to travel along row crops and to work the ground closely on opposite sides of the row; the implement as here shown including duel ground working units whereby to simultaneously act on adjacent rows.

A further object of the invention is to provide an implement, of the type described, which includes for each row on which the implement is adapted to work, a power driven, rotary ground working unit or spinner of novel construction and operation.

Another object of the invention is to provide an implement, as in the preceding paragraph, in which each ground working unit includes transversely spaced spinners adapted to work on opposite sides of but closely adjacent a crop row; such unit being mounted in unique manner for selective horizontal or vertical adjustment, and which adjustment is accomplished by an operator on the implement.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement.

Figure 2 is a plan view of the implement.

Figure 3 is an enlarged fragmentary cross section on line 3—3 of Fig. 2, showing the structural details of one of the rotary, ground working units.

Figure 4 is a fragmentary rear end view of the row crop spraying means which is included in the implement.

Figure 5 is a diagrammatic cross section of adjacent two-row crop ridges, illustrating the working positions of the dual rotary ground working units of the present implement.

Referring now more particularly to the characters of reference on the drawings, the implement comprises a horizontal main frame 1 supported above and for movement along the ground by means of transversely spaced front and rear wheels, indicated at 2 and 3, respectively. The front wheels 2 are steerably mounted, as indicated generally at 4, and are steered by means of a steering assembly 5 which includes an upwardly and rearwardly inclined steering column 6 fitted at its upper end, and at an elevated point above the rear end portion of the main frame 1, with a steering wheel 7. An elevated operator's seat 8 is mounted, adjacent the steering wheel 7, on an upstanding supporting frame 9 rigid with the main frame 1.

To the rear of and below the operator's seat the implement includes an engine 10 mounted on the main frame 1; said engine including a drive shaft 11 having a clutch 12 interposed therein. The drive shaft 11 is connected in driving relation to a substantially full-width cross shaft 13 on the frame directly below the operator's seat, and said cross shaft drives the rear wheels 3 of the implement through the medium of a bevel gear assembly 14, an endless chain unit 15, and a differential 16.

The transverse spacing of the front and rear wheels is such that the implement can straddle and travel along in spanning relation over a predetermined number of crop rows, the operator steering the implement from the seat 8.

Ahead of and below the operator's seat 8 the implement includes a transverse seat or bench 17 ahead of which the main frame is open. Within said open portion of the main frame and ahead of the seat 17 the implement includes a pair of vertically and horizontally adjustable rotary, ground working units, each of which is indicated generally at 18, and each of which is adapted to be adjustably controlled by a corresponding operator seated on the seat 17. The operators sit side by side on said seat.

As each of the rotary, ground working units 18 is of the same construction and operation, a description of one will suffice.

Each rotary, ground working unit 18 comprises a forwardly facing U-shaped frame 19 rigidly connected at the rear with a pair of push beams 20 which converge rearwardly and merge adjacent but short of the rear end of one of said beams to form what is hereinafter termed a push beam unit. At the rear end each push beam unit is connected to the cross shaft 13 by a coupling 21 which permits of both horizontal and vertical swinging of said push beam unit, the coupling 21 including a collar about the shaft 13, and a clevis to which the push beam unit is pivoted on an upstanding axis, as shown.

Adjacent the forward end thereof the rigid

U-frame 19 is fitted with a transversely extending rotary cross shaft 22, said cross shaft being journaled, adjacent its ends, in bearings 23. At one end the shaft 22 projects beyond the corresponding bearing 23 and said projecting portion of the shaft is driven from the cross shaft 13 by a relatively long sprocket and chain unit 24; the length of said sprocket and chain unit permitting of a certain lateral or horizontal play of the assembly of frame 19 and push beam unit 20, while vertical play of said assembly is possible for the reason that the push beam 20 and sprocket and chain unit 24 are secured concentrically to said cross shaft 13.

The driven cross shaft 22 on the U-frame 19 is fitted, at transversely spaced points, with hubs 25, from each of which a plurality of circumferentially spaced radial arms 26 project in detachable relation. The arms 26 are formed, at their outer ends, with cultivator or chopper blades 27. In the present embodiment the blades 27, to the outside of the unit 18, are at right angles to the arms 26, while said blades to the inside of the unit 18, are diagonal transversely of the direction of rotation, for the purpose as will hereinafter appear.

Each assembly of hubs 25, radial arms 26, and blades 27 comprises what may be termed a rotary cultivator or spinner.

Between said spinners the rotary ground working unit 18 includes a pair of longitudinally extending, vertical guard or shield plates 28 disposed in transversely spaced relation, and between which a crop row is adapted to pass in shielded relation. The shields 28 are rigidly connected between the back of U-frame 19 and the cross shaft 22, and above the latter, by a heavy-duty cross plate 29 which is formed in rigid unitary relation with said frame.

The above described rotary, ground working unit is suspended for horizontal and vertical movement, under the control of an operator on the seat 17, in the following manner:

Ahead of the seat 17, but slightly to the rear of and above the U-frame 19, the main frame 1 supports a cross shaft 30 on which a turntable unit, indicated at 31, is mounted for each earth working unit 18. Each turntable unit includes an upper turntable disc 32 turnably mounted about an upstanding pin 33 on a bottom turntable disc 34, which in turn is mounted by a transverse bearing 35 on cross shaft 30 for tilting of the turntable unit as a whole in the direction of travel, i. e. about a transverse horizontal axis.

A tiller handle 36 is fixed in connection with the upper turntable disc 32, and extends upwardly and rearwardly for ready access from the seat 17. At its lower end the handle 36 is formed with a forwardly and upwardly opening fork 37 which is rigid with said upper turntable disc 32. The fork 37 straddles a rigid upstanding post 38 on the rotary, earth working unit 18, said post being fixed in connection with the cross plate 29 and suitably braced.

It will be seen that with rotary motion of the turntable disc 32 about the pin 33 under the influence of the tiller handle 36, the fork 37 will urge the post 38 in one direction or the other, causing horizontal lateral adjustment of the rotary, earth working unit 18.

A pair of rigid arms 39 are fixed on the upper turntable disc 32 and project forwardly therefrom in diverging relation, and in overhanging relation to opposite sides of the U-frame 19. Pivotally mounted links 40 are connected between the outer end portions of the divergent arms 39 and the corresponding side portions of the U-frame 19. This arrangement of arms and links suspends the rotary earth working unit 18 above ground, and in a vertically adjustable position. It will be seen that with rocking motion of the turntable unit 31 about the cross shaft 30 as an axis, and under the influence of the tiller handle 36, the rotary, ground working unit 18 may be adjusted up or down, as conditions may require.

With each rotary earth working unit 18 mounted and controlled as above described, a corresponding operator on the seat 17 can manipulate said unit 18 within relatively fine limits, either horizontally or vertically.

In the present embodiment the implement is adapted to work on adjacent ridges 41 of a row crop, and wherein each ridge is planted with transversely spaced, parallel crop rows 42.

The transverse spacing of the units 18, and the transverse spacing of the spinners of each unit, is such that when the implement advances in straddling relation to said ridges 41, each rotary earth working unit 18 functions as shown diagrammatically in Fig. 5. The outermost straight-across blades 27 of each spinner engage between the parallel rows 42 to cultivate the earth on top of the ridge adjacent one of said rows, while the innermost and diagonal blades 27 of said spinner work on the inclined side of the ridge laterally out from said one row. The spacing of the spinners, and consequently the blades 27, may be altered by providing for axial adjustment of the hubs 25, whereby the implement can be adapted to various crop row spacing. Also, if the crop rows are not on ridged ground, all of the blades 27 would be straight across.

In order to spray the crop rows 42 with insecticide or fungicide, or with a weed killer to kill weeds directly between the plants not reached by the spinners, the following mechanism is employed:

The main frame 1 supports, at the rear and beyond one end of the engine 10, a tank 43 which feeds through a piping system 44 to a pair of transversely spaced hood assemblies, indicated at 45, suspended from the main frame at the rear end in such transversely spaced relation that each such assembly cooperates with the dual plant rows on one ridge, in the manner shown in Fig. 4. Each hood assembly includes a transversely spaced pair of longitudinally extending, open-ended hoods 46, the piping assembly including a depending branch 47 disposed between adjacent hoods 46 and there fitted with a Y 48 from which oppositely extending nozzles 49 enter the hoods 46. As the implement advances liquid is sprayed from the nozzles 49 into the center of each row.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An agricultural implement comprising a frame supported for movement along a crop row, a rotary ground working unit including a power driven spinner, means mounting the unit in connection with the frame for vertical and horizontal adjustment relative thereto and for working engagement of the spinner with the ground along the row, and manually actuated means operative to selectively effect vertical or horizontal adjustment of the unit; said means including a turntable mounted for rotation about an upstanding axis and for tilting movement lengthwise of the direction of travel, and a tiller handle mounted on said turntable, rotation of the latter adjusting the unit horizontally while tilting of the turntable adjusts the unit vertically.

2. An agricultural implement comprising a frame supported for movement along a crop row, a rotary ground working unit including a power driven spinner, a push beam extending in rigid relation rearwardly from the unit, means connecting the push beam at the rear to the frame for vertical and horizontal swinging adjustment, the spinner being adapted for working engagement with the ground along the row, and manually actuated means suspending the unit from the frame for selective vertical or horizontal adjustment; said last named means comprising a tiller handle mounted for turning movement about an upstanding axis and for swinging movement lengthwise of the implement, and connecting elements between the handle and unit operative to convert turning movement of the handle to lateral horizontal motion of said unit, and to convert longitudinal swinging movement of the handle to vertical motion of said unit.

3. An agricultural implement comprising a frame supported for movement along a crop row, a rotary ground working unit including a power driven spinner, a push beam extending in rigid relation rearwardly from the unit, means connecting the push beam at the rear to the frame for vertical and horizontal swinging adjustment, the spinner being adapted for working engagement with the ground along the row, and manually actuated means suspending the unit from the frame for selective vertical or horizontal adjustment; said last named means comprising a turntable above the unit and mounted for rotation about an upstanding axis and for tilting movement about a transverse horizontal axis, a tiller handle fixed on the turntable and extending therefrom lengthwise of the implement, a fork projecting from the turntable lengthwise of the implement, a rigid post on the unit upstanding between the fork, for horizontal adjustment thereby, and a pivotally connected link extending between the turntable outwardly of its transverse axis and the unit in suspending and vertical adjusting relation to the latter.

4. An implement as in claim 3 in which the tiller handle is inclined upwardly and rearwardly, and a forwardly facing seat on the frame within reach of the tiller handle.

5. An agricultural implement comprising a main frame supported for movement along a crop row, a push beam secured at its rear end on the main frame for vertical and horizontal swinging adjustment, a forwardly opening U-frame on the front end of the push beam, a cross shaft journaled on the U-frame, a pair of transversely spaced spinners mounted on the shaft within the frame, means to drive said spinners while permitting of vertical or horizontal adjustment of the U-frame, and manually actuated means suspending the unit from the main frame for selective vertical or horizontal adjustment; said drive means comprising a driven cross shaft on the main frame, the push beam being vertically swingable about said cross shaft as an axis, and a chain and sprocket unit connected between the cross shaft on the main frame and the cross shaft on the U-frame.

6. An agricultural implement comprising a main frame supported for movement along a crop row, a push beam secured at its rear end on the main frame for vertical and horizontal swinging adjustment, a forwardly opening U-frame on the front end of the push beam, a cross shaft journaled on the U-frame, a pair of transversely spaced spinners mounted on the shaft within the frame, means to drive said spinners while permitting of vertical or horizontal adjustment of the U-frame, and manually actuated means suspending the unit from the main frame for selective vertical or horizontal adjustment; there being a transversely spaced pair of vertical, longitudinally extending shield plates mounted in connection with the U-frame between said spinners.

7. An agricultural implement comprising a main frame supported for movement along a crop row, a push beam secured at its rear end on the main frame for vertical and horizontal swinging adjustment, a forwardly opening U-frame on the front end of the push beam, a cross shaft journaled on the U-frame, a pair of transversely spaced spinners mounted on the shaft within the frame, means to drive said spinners while permitting of vertical or horizontal adjustment of the U-frame, a turntable mounted in connection with the main frame above the unit, said turntable being turnable about an upstanding axis and tiltable about a transverse horizontal axis, a tiller handle projecting from the turntable lengthwise of the direction of travel, a pair of transversely spaced arms rigid with the turntable projecting from the same in overhanging relation to the opposite sides of the U-frame, pivotally connected links extending between said arms and opposite sides of the U-frame, an upstanding post on the unit between said arms, and a rigid fork projecting from the turntable straddling said post.

8. An agricultural implement comprising a main frame supported for movement along and over a row crop, a push beam secured at its rear end on the main frame for vertical and horizontal swinging adjustment relative to such main frame, a forwardly opening U-shaped frame on the forward end of the push beam, a cross shaft journaled on the U-frame, a pair of transversely spaced spinners mounted on the shaft within the U-frame, each spinner including a plurality of radially projecting, circumferentially spaced arms and ground working blades on the outer ends of the arms, pivot and lever elements connected between the main frame and the push beam and U-frame unit and operable to selectively adjust such unit vertically or horizontally, and power means mounted on the frame and connected in driving relation with the spinners.

9. An implement as in claim 8 in which the blades on one set of arms are disposed at substantially right angles to the arms while those on the other set of arms are disposed diagonally of the arms whereby the former will work against the horizontal surface of a ridge of earth while the latter will work against an inclined side of such ridge.

10. An agricultural implement comprising a substantially rigid frame mounted for movement along and over a row crop, a push beam secured at its rear end to the main frame for vertical and horizontal swinging movement relative to such main frame, an element mounted on the main frame at a point above and adjacent the outer end of the push beam, such element including pivot members connecting such element to the main frame for swinging movement of the element through a vertical plane longitudinally of the main frame, the element also including a lever and pivot members operable to rotate such element in a substantially horizontal plane, the outer end of the push beam being suspended from said element, and an earth working element mounted on the outer end of the push beam.

BYRON M. PETERS.

REFERENCES CITED

The following references are of record in the file of this patent:

UNITED STATES PATENTS

| Number | Name | Date |
|---|---|---|
| 1,010,238 | Cook et al. | Nov. 28, 1911 |
| 1,036,460 | Daniel | Aug. 20, 1912 |
| 1,203,091 | Autry | Oct. 31, 1916 |
| 1,279,418 | Peel | Sept. 17, 1918 |
| 1,284,208 | Anderson et al. | Nov. 12, 1918 |
| 1,439,579 | Roach | Dec. 19, 1922 |
| 1,907,332 | Paris | May 2, 1933 |
| 2,229,290 | Gosser | Jan. 21, 1941 |
| 2,364,862 | McLary | Dec. 12, 1944 |

FOREIGN PATENTS

| Number | Country | Date |
|---|---|---|
| 512,199 | France | Oct. 7, 1920 |